Patented Apr. 12, 1932

1,853,332

UNITED STATES PATENT OFFICE

CLINTON BATEHOLTS, OF HOOSICK FALLS, NEW YORK, ASSIGNOR TO COLASTA COMPANY, INC., OF HOOSICK FALLS, NEW YORK, A CORPORATION OF NEW YORK

MOLDABLE COMPOSITION OF MATTER AND THE ART OF MAKING THE SAME

No Drawing.   Application filed May 8, 1930.   Serial No. 450,880.

This invention relates to improvements in moldable compositions of matter.

More especially it relates to compositions which embody a fibrous reinforcing material within and impregnated by a moldable binding substance such as shellac or a synthetic resin which hardens under heat and pressure, examples of which are phenolic-formaldehyde condensation products and synthetic rubber substitutes. The products of such, herein referred to as resinoids, may be molded articles of any of a variety of shapes, sizes and uses. The reinforcing material adds strength and protection against brittleness; and in the case of the present invention it also acts as a filler and reduces the cost.

Heretofore fillers of comminuted material have been used, as wood flour or asbestos; also laminated or single sheet layers of paper, or of cotton duck; also long loose fibres of cotton. These have all been found unsatisfactory in various ways, as set forth for example in the patent of Willard H. Kempton, 1,513,323 of October 28, 1924, which proposes to make a loose fluffy mass of long fibres by comminuting cloth that has been impregnated and dried while in sheet form, saying that long loose fibres of cotton or other material cannot be used directly because the attempt to mix and impregnate them forms them into wads or lumps of fibres into which powdered material of the binder does not penetrate uniformly. However, even the proposed shredding or grinding of this pre-dipped and subsequently dried sheet material leaves ends and sides of fibres, exposed by the shredding, which the subsequent flow of the binder does not always cover and which may act as wicks for moisture.

The present invention is an improvement in the general field above indicated, whereby the sundry difficulties heretofore encountered are avoided and a superior molded article is produced, with the triple result that it is a more perfect product; is made by fewer and simpler steps of manufacture; and is made at lower cost.

The invention employs, for the reinforcing filler, crumpled small sheets of thin cloth, preferably having slippery surfaces, as of silk or rayon. The sheets which go together to make any particular article have sizes and shapes which preferably vary, irregularly and at random. For illustration it may be stated that sheets of the order of six to twelve inches long, and a quarter inch to two or more inches wide, fall within the said category of "small sheets;" but these stated dimensions are not to be considered as strict limits, in either direction. Cloth which is relatively soft and flexible, like shirtings or women's cotton, rayon or silk dress goods, falls within the said category of "thin" as distinguished from duck which is relatively tough, thick and stiff. And the having of a "slippery surface" is best accomplished by using a sheet material which has interwoven rayon distributed over its surface. This is not necessary in molding articles where the composition lies in the thicker masses, but it is especially desirable for obtaining adequate distribution of the reinforcing sheets into corners and intricacies of the mold, and for portions of the article which are thin. Silk will serve, although I have not found it as satisfactory as rayon. It is not necessary that the entire surface of the cloth be thus covered, but sheets having designs of rayon or silk spread at intervals over the surface of cotton serve satisfactorily. As a practical matter, all of these requirements, the thinness, the slippery surface, and the random small sizes are found satisfied by waste clippings of men's or women's tailors, using the kinds of cloth above indicated.

In the process of manufacture a loosely jumbled mass of clippings of woven fabric as described is first thoroughly impregnated with the material which is to constitute the binder, which may be shellac, for example, or preferably one of its numerous substitutes or equivalents, such as a phenolic condensation product or a rubber substitute, such as, for example, is set forth in the patents to William W. Carter 1,251,862 and 1,251,863 granted January 1, 1918. The binder material in its liquid or varnish form is easily impregnated into the clippings by immersion; and the mass is then ready to be used in the mold.

If prepared in advance of the time for molding, the impregnated clippings may first be allowed to dry; and then, preferably, before being put into the mold, they are compacted together into a solid mass; and this mass then cut into sections, each of which is a pill of predetermined shape and size for insertion in a mold, and contains approximately the requisite quantity of such material to form the complete molded article. The impregnated material is then used for the molding according to practices already known.

The material may be thus formed into the pill without preliminary drying. If it has been dried, it may be put dry into the mold, which is the more usual method. In either case any desired quantity of the binding material may be added, either in liquid form or in form of a powder, or of an additional pill, when placed in the mold. When heat and pressure are applied in the mold the binding material softens and runs into all the recesses of the mold. The slippery surface feature of the cloth cooperates with the crumpled and small-sheet features of the cloth, to permit the cloth to work itself into the corners, intricacies and thin places of the mold. When under high pressure, the mass of cloth, and individual folds of it in the crumpled condition, can slip about so as in effect to flow with the liquid; and thus the reinforcing filler of sheet fibrous material adjusts its position, according to the shape of the mold, and to a great extent behaves like a frictionless fluid;—and finally it becomes held in its molded position when the binder changes from liquid to solid form. By the compacting of the small-sheets from their original loosely jumbled condition, those loops of the cloth which initially were extending thickwise of the mass become collapsed into folds or bights. The collapsing of such loops provides a sort of fullness such that any portion of the cloth can slip about in directions transverse to the compressive movement, if occasion requires some such flow of the cloth during the molding operation.

In the finished product, because of the crumpled formation, the threads and fibres therein are extending in all directions of space. Because of the pre-impregnation these are securely attached to the resin, which as a whole becomes integrated by interflux and solidification. And because of the substantial sizes and woven character of the reinforcing sheets, adjacent fibres in the mass are organized together in threads and the threads are bound to each other in cross-directions by their interlacing. Thus the reinforcement is greater than where the filler has been introduced in comminuted form, in which case each little particle of filler is separate from others. It is also greater because each fibre and each thread of the filler remains as completely encased and impregnated as it ever became in the preliminary impregnating operation. This is by contrast with any system wherein the preparation is by first impregnating and then comminuting the filler material, in which case some of the threads are torn bare or left with exposed ends, and some of these never become adequately re-impregnated by other material during the molding process, so that in the resulting product some ends and threads remain not covered with the impregnating compound, and therefore not securely adhering. Where any of these lie at the surface they can act as wicks to moisture, thus reducing the di-electric properties and introducing other objectionable characteristics. By the present invention this is avoided; the encasing of fibres with binder, and the adhesions of binder to fibre are left intact, because there is no shredding after the impregnating.

Articles molded in accordance with the invention are found to have superior reinforcement of the binding composition in all directions, with resulting superior strength; having also a uniform and reliable quality of surface. There is a more complete distribution of the filler throughout the molded article, and greater continuity of adhesion of binder to filler, across any section. And as contrasted with laminated fillers heretofore used the invention is available for the molding of irregular shapes, where the smoothly laminated sheets are not.

The present invention is particularly applicable where the molded article has a slender portion which is required to be strong, in which it has not heretofore been practicable to embody sheet material, and where the use of any of the simpler comminuted fillers, as ground wood, makes a structure which is too weak. Using long fibres in the form of cloth, it nevertheless eliminates the comminuting operation; and yet the reinforcing sheets can work into irregular shapes and thicknesses. The nature and source of materials used, the omission of the comminuting, the ease of handling, and the reduction of hand labor to execute the various steps are features which all cooperate to make a reduced cost of manufacture. And because of the crumpled and diverse directional extent of the woven sheet material throughout the mass of the textile resinoid which constitutes the finished product, the said superior strength is attained. By contrast, in previous attempts by me to use cotton cloth, the resulting molded product has had certain advantages, but has not been equal to that attained by material having a slippery surface, in that it has not been uniformly distributed through it, particularly where the molded body has been relatively thin. Thin spaces of the mold would be unpenetrated and unstrengthened by the cloth filler and thus would lack the tenacity and strength which are needed at those points even more than elsewhere.

For illustration of the practice of the invention, waste materials in the form of cuttings and trimmings, from shirt and underwear manufacturers, also from makers of women's dresses and underwear, are used in all sorts of irregular shapes, of short length and somewhat narrow. As found commercially these usually are strips upwards of four inches in length, and an inch, more or less, in width, of cotton fabric adorned with patterns in rayon or silk.

For superior slipping, all-rayon fabric is preferable. Silk may be used, but I have found that a mass embodying silk is not so readily moldable into intricate shape as one in which the slipping element is rayon. It is observed that a molded article embodying silk as its filler has greater density than one having rayon for its filler.

For the binder, bakelite may be used, or preferably the product described in said Carter patents, in varnish form, which is to be impregnated into the woven fragments, as by immersing the jumbled small sheets thereof in a bath of the liquid. The material thus prepared may be molded and hardened by any suitable process and apparatus, usually by heat and pressure in a mold.

It is intended that the patent shall cover, by suitable expression in the appended claims, whatever features of patentable novelty exist in the invention disclosed.

I claim as my invention:

1. A moldable composition for making a re-inforced resinoid body having a slender dimension of the order of a minor fraction of an inch, comprising a mass of irregularly assembled small-sheets of cloth which individually have lengths of the order of a plurality of inches, mingled and impregnated with material which is moldable to make the resinoid body.

2. A molded, slender-dimensioned, re-inforced resinoid body, wherein the reinforcement comprises sheets of cloth, embedded in the slender part of the body and individually having lengths which, as to direction, extend irregularly; and which, as to distance, extend in crumpled condition in that direction in which the slender portion of the body extends, for distances that are of the order of a multiplicity of thicknesses of the said slender portion of the body.

3. A moldable composition for a resinoid body, comprising a mass of small-sheets of the nature of tailors' clippings, being sheets of cloth individually having lengths of the order of several inches each; said small sheets being irregularly assembled throughout and impregnated in a composite sheet of moldable resinoid material whose thickness is a minor fraction of the said sheet length.

4. A moldable composition for a resinoid body, comprising an impregnated mass of cloth small-sheets, said sheets being of material which had, before the impregnation, a slippery surface, as of rayon; the said impregnation being with material which is moldable to make the said resinoid body; whereby, during the molding, the said slippery surface facilitates the flowing of the cloth with the plastic resinoid in slender parts of the mold.

5. The method of making molded articles, which comprises the massing together of irregularly crumpled small-sheets, said small-sheets individually having lengths of a plurality of inches, as of the order of tailors' clippings, whereby in general arrangement each sheet overlaps several other adjacent sheets; impregnating the assembled mass with a material capable of being molded into the desired shape of article; drying the mass; compressing and cutting the impregnated mass of overlying small-sheets into pills; and, under pressure, molding the pills, with other material if desired, to make the articles.

Signed at Hoosick Falls, New York, this 6th day of May, 1930.

CLINTON BATEHOLTS.